(No Model.)  2 Sheets—Sheet 1.

J. HEHSDÖRFER.
MEAT TENDERING MACHINE.

No. 525,077. Patented Aug. 28, 1894.

WITNESSES:
Wm. H. Canfield Jr.
G. Basil Hooper.

INVENTOR:
Joseph Hehsdörfer,
BY Fred C. Fraentzel ATT'Y.

THE NORRIS PETERS CO., PHOTO-LITHO., WASHINGTON, D. C.

(No Model.) 2 Sheets—Sheet 2.

J. HEHSDÖRFER.
MEAT TENDERING MACHINE.

No. 525,077. Patented Aug. 28, 1894.

WITNESSES: Wm. H. Camfield, Jr.
G. Basil Hooper.

INVENTOR: Joseph Hehsdörfer,
BY Fred O. Graentzel, ATT'Y.

UNITED STATES PATENT OFFICE.

JOSEPH HEHSDÖRFER, OF NEWARK, NEW JERSEY.

MEAT-TENDERING MACHINE.

SPECIFICATION forming part of Letters Patent No. 525,077, dated August 28, 1894.

Application filed November 28, 1893. Serial No. 492,240. (No model.)

*To all whom it may concern:*

Be it known that I, JOSEPH HEHSDÖRFER, a subject of the Emperor of Germany, residing at Newark, in the county of Essex and State of New Jersey, have invented certain new and useful Improvements in Meat-Tendering Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in meat tendering machines, and has for its object to provide a machine of this class, wherein meat may be successfully crushed and the juices of the meat retained, containing all the soluble albumen therein, the meat being thereby more readily adapted for the manufacture of sausages, bolognas, &c.

The invention therefore consists in the novel construction of the machine herein set forth, as well as in the arrangement and combination of parts to be hereinafter more fully described and finally embodied in the clauses of the claim.

In the accompanying sheets of drawings I have represented the preferred embodiment of my invention.

Figure 1:
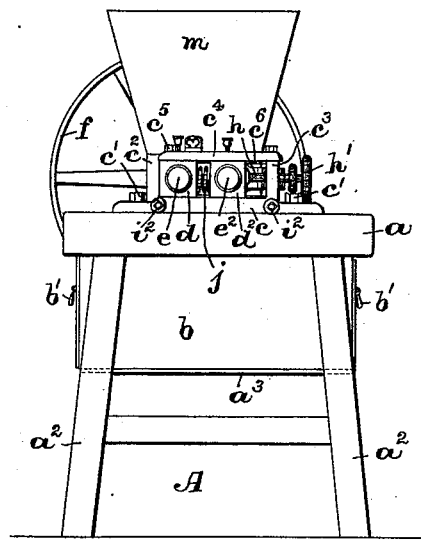
Figure 2:
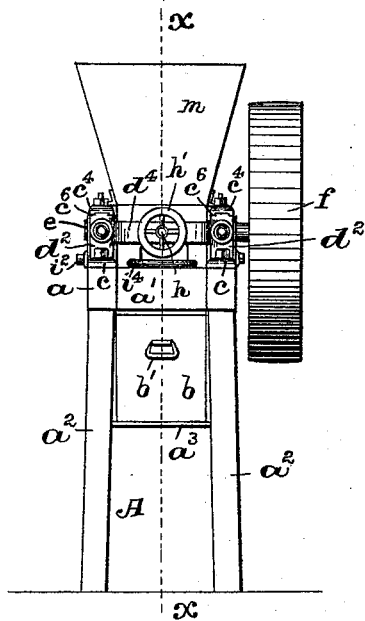
Figure 3:
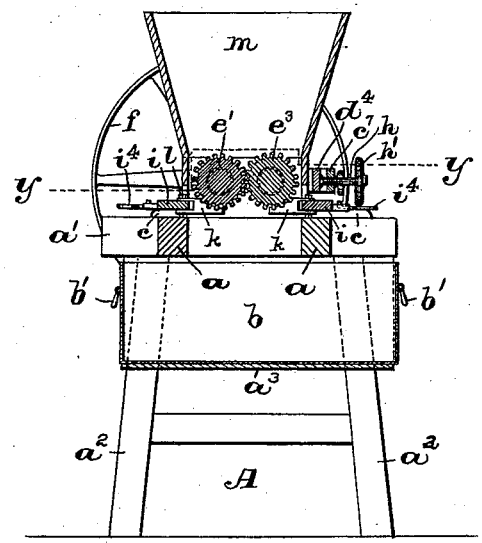
Figure 4:
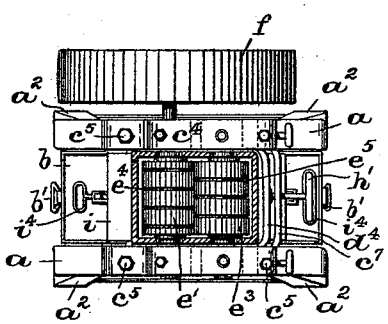
Figure 5:
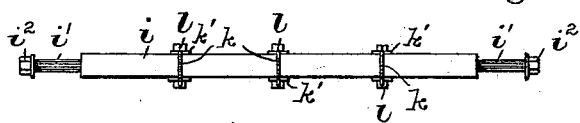
Figure 6:
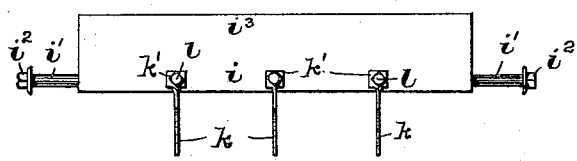
Figure 7:
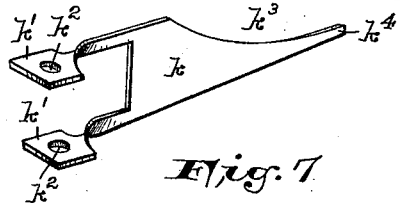
Figure 8:
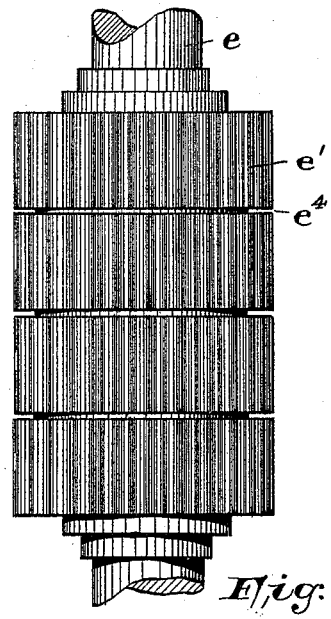
Figure 10:
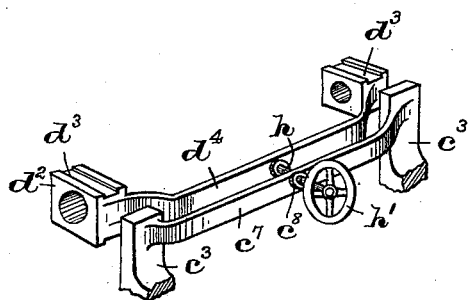
Figure 9:
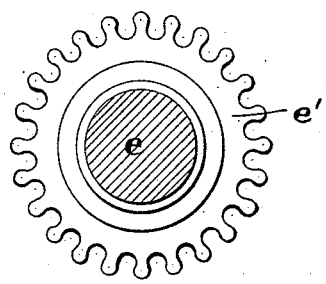

Figure 1 is a side elevation of the machine. Fig. 2 is an end view of the same; and Fig. 3 is a longitudinal vertical section of the machine, taken on line $x$ in Fig. 2. Fig. 4 is a horizontal section of the machine taken on line $y$ in Fig. 3. Figs. 5 and 6 are a side and top view respectively of an adjustable and pivotally arranged knife support, and Fig. 7 is a perspective view of one of the knives used in connection with said support. Fig. 8 is a top view and Fig. 9 is an end view of one of the fluted or corrugated rollers used in the machine; and Fig. 10 is a perspective view of an adjustable supporting frame, for supporting one of said fluted or corrugated rollers therein.

Similar letters of reference are employed in each of the several views to indicate corresponding parts.

In said drawings, A is the frame of the machine, comprising therein the longitudinal pieces $a$, the cross-pieces $a'$ and the legs $a^2$. Arranged between the four legs $a^2$ of the machine is a support $a^3$, on which can be placed a suitable receptacle $b$, which is provided with handles $b'$ on the opposite sides thereof.

On the longitudinal pieces $a$ are secured by means of bolts or screws $c'$, suitable pillow-blocks $c$, provided, as will be seen from Fig. 1 of the drawings, with uprights $c^2$ and $c^3$, which are connected at the top by a guide bar $c^4$. Arranged against the uprights $c^2$ on the two sides of the machine and secured between said pillow-blocks and the guide-bar $c^4$ is a bearing $d$ which is fixed in such position between said parts by a bolt $c^5$.

On a shaft $e$ arranged in the bearing $d$ on the two sides of the machine is a fluted or corrugated roll $e'$. One end of said shaft $e$ extends on one side of the machine and has a suitable pulley wheel $f$ thereon, around which passes a belt from some suitable driving pulley, for the purpose of rotating said roll $e'$. Said guide-bars $c^4$ are each provided with a guided portion $c^6$ projecting downwardly from said bars, which fit into grooves $d^3$ in the bearing blocks $d^2$, illustrated more especially in Fig. 10. Said bearing blocks $d^2$, as will be seen from Fig. 10, are connected with each other by means of a bar $d^4$.

The standards $c^3$ extending upwardly from the block $c$ on the opposite sides of the machine, are connected by a bar $c^7$ provided with a centrally arranged screw-threaded boss $c^8$. In said boss is arranged a screw $h$, which is rotatively connected at its one end with said bar $d^4$ connecting said blocks $d^2$ and is provided on its opposite end with a hand wheel $h'$. On a shaft $e^2$ arranged in said bearing blocks $d^2$ is a second fluted or corrugated roll $e^3$, the fluting or corrugations of which are made to intermesh with the flutings or corrugations of the roll $e'$, as will be clearly seen from Figs. 3 and 4. By turning the hand wheel $h'$, to the right or left, said blocks $d^2$ can be made to slide back and forth in the guide bars $c^4$ and hence the roll $e^3$ and its corrugations or flutings can be brought closer to or farther away from the roll $e'$, as may be desired. A suitable spring $j$ may be arranged between the two bearing blocks $d$ and $d^2$ on the one side or both sides of the machine, as will be seen from Fig. 1. Said blocks $c$ are provided on both sides of the machine with suitable holes in which are placed the journals $i'$ of the knife-holder $i$, illustrated in Figs. 5 and 6, said holders being arranged one on each side of the rolls $e'$ and $e^3$, as shown in Fig. 3, and the screw-threaded ends of said journals $i'$ projecting from said holes in the blocks $c$, being secured by the nuts $i^2$ in such position, as will be understood.

Each knife-holder $i$ has secured thereto any suitable number of peculiarly shaped knives $k$, which are preferably formed with the holding ears $k'$ having perforations $k^2$ therein. Said ears fit onto the opposite sides of the knife-holder $i$ and a bolt $l$ is passed through the holes $k^2$ in said ears and through a correspondingly arranged hole in the support $i$, to firmly secure the knife in position on the support. Each knife $k$ is provided with a curved cut-away portion $k^3$ and a pointed end $k^4$, which normally extend beneath the rolls $e'$ and $e^3$ and respectively fit into annular grooves $e^4$ and $e^5$ in said rolls. Said support $i$ is weighted at the one side, as at $i^3$, see Fig. 6, which balances the knives in such positions to cause them to retain their proper positions in relation to the surface of the rolls $e'$ and $e^3$. Each support $i$ may also be provided with a finger-piece $i^4$ whereby the knives can be swung away from their close positions to the surfaces of the rolls, should any large pieces of meat or cartilage become stuck between the knives and the surfaces of the rolls.

The corrugations or flutings in the rolls $e'$ and $e^3$ are preferably made as illustrated in Fig. 9, which permits of the meat being thoroughly mashed or crushed to a jelly-like mass, but it will be understood that any other suitable form of corrugations may be employed. The annular grooves $e^4$ and $e^5$ in the rolls $e'$ and $e^3$, respectively, are preferably arranged to alternate, as illustrated in Fig. 4. Surrounding said rolls and supported on the frame-work of the machine is a suitable hopper $m$ into which the meat to be minced is thrown.

When the machine is operated by the pulley $f$ driving the roll $e$, the intermeshing flutings will drive the previously adjusted roll $e^3$ and the meat is drawn down between the two rolls, being thoroughly squeezed and mashed by the flutings, and dropping in a jelly-like mass into the receptacle $b$ from which it is removed from time to time to be used in the manufacture of sausages, bolognas, &c. The cartilage or other gristle-like matter contained in the meat will stick to the rolls, and is retained by the curved portions $k^3$ fitting into the grooves in the rolls, from which this objectionable matter is removed from time to time by raising the handle or finger-pieces $i^4$ and thereby lowering the knives $k$ to be cleaned.

Having thus described the general construction of my machine and the improvements therein, I do not desire to be understood as restricting myself to the exact construction and arrangement of the details hereinbefore described, as I am fully aware that the same may be varied without departing from the scope of my invention. Therefore

What I claim is—

1. In a meat tendering machine, the combination, of a pair of rolls having corrugations or flutings, means for driving the same, a knife-holding device pivotally arranged in the frame of the machine, and knives $k$ on said holder, substantially as and for the purposes set forth.

2. In a meat tendering machine, the combination, of the frame thereof, bearing blocks $d$, a corrugated roll journaled in said blocks, adjustable bearing-blocks $d^2$, a corrugated roll journaled in said blocks $d^2$, the corrugations on said roll intermeshing with the corrugations on the roll journaled in said blocks $d$, and means for causing the adjustment of said blocks $d^2$, and a knife-holding device pivotally arranged in said bearings, $d^2$ having knives $k$ thereon, substantially as and for the purposes set forth.

3. In a meat tendering machine, the combination, of the frame thereof, bearing blocks $d$, a corrugated roll journaled in said blocks, adjustable bearing blocks $d^2$, a corrugated roll journaled in said blocks $d^2$, the corrugations on said roll intermeshing with the corrugations on the roll journaled in said blocks $d$, and means for causing the adjustment of said blocks $d^2$, consisting essentially of a bar $d^4$ connecting said blocks $d^2$, a bar $c^7$ on the frame of the machine, a screw $h$ and a hand wheel $h'$, and a knife-holding device pivotally arranged in said bearings $d^2$, having knives $k$ thereon, all arranged substantially as and for the purposes set forth.

4. In a meat tendering machine, the combination, of a pair of rolls having corrugations or flutings, annular recesses in said rolls, means for driving the same, a knife-holding device pivoted in the frame of the machine, and knives $k$ thereon provided with the curved portions $k^3$ and points $k^4$ extending into annular recesses in said rolls, substantially as and for the purposes set forth.

5. In a meat tendering machine, the combination, of a pair of rolls having corrugations or flutings, annular recesses in said rolls, means for driving the same, a knife-holding device pivoted in the frame of the machine, and adjustably arranged knives $k$ thereon provided with the curved portions $k^3$ and points $k^4$ extending into annular recesses in said rolls, substantially as and for the purposes set forth.

In testimony that I claim the invention set forth above I have hereunto set my hand this 22d day of November, 1893.

JOSEPH HEHSDÖRFER.

Witnesses:
FREDK. C. FRAENTZEL,
WM. H. CAMFIELD, Jr.